Figure 1:
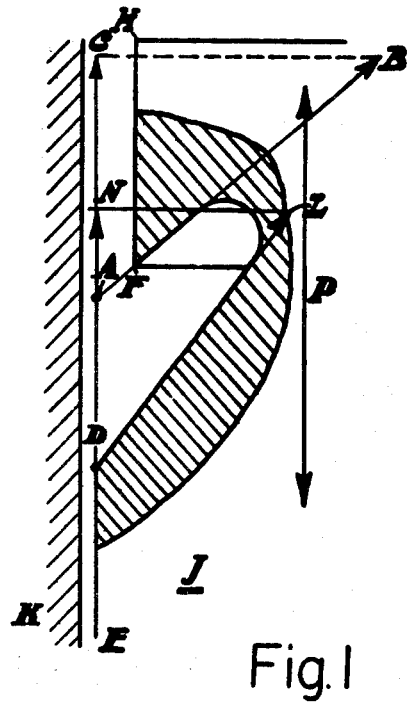

Dec. 28, 1954  R. J. MEYER  2,698,209
LUBRICATION CONTROL FOR PISTONS
Filed Oct. 26, 1949

INVENTOR.
ROELF JAN MEYER
BY
AGENT

United States Patent Office 2,698,209
Patented Dec. 28, 1954

2,698,209

LUBRICATION CONTROL FOR PISTONS

Roelf Jan Meyer, Eindhoven, Netherlands, assignor to Hartford National Bank and Trust Company, Hartford, Conn., as trustee Application October 26, 1949, Serial No. 123,549

Claims priority, application Netherlands October 30, 1948

7 Claims. (Cl. 309—8)

This invention relates to combinations of two bodies, one of which performs a reciprocating movement relatively to the other, the surface parts of the bodies facing one another being spaced apart by an intermediate space of small cross section which contains a lubricant.

It is known that in such a combination of bodies the lubricant may be transported from the point of supply to a different area. If the working space of the device, which may be a compressor, a refrigerator, a hot-gas reciprocating engine, a steam engine or an internal combustion engine, in such an area, the lubricant may be carried along with the working medium in this working space. This lubricant may deposit at undesired points for example on heat-exchangers. In this respect, the term "heat exchangers" may, for example, be understood to mean condensers, coolers, heaters and regenerators. Owing thereto, the heat-transmitting properties of the heat-exchangers are reduced, so that the output of the apparatus is adversely affected. In addition, the lubricant carried along may give rise to a carbon deposit, for example in internal combustion engines, by which also the operation of the engine is adversely affected. A further disadvantage is that the lubricant consumption is unduly high.

If further parts of the apparatus which require to be lubricated or not lubricated are provided at the side of the point of supply to which the lubricant is transported, it may be of importance to reduce the quantity of lubricant supplied to these parts of the apparatus. If the reciprocating member is provided with rings, for instance piston rings, the rings provide, as is known, a pumping effect, so that a particularly great quantity of lubricant is transported.

The object of the invention is to reduce the transport of lubricant in such a combination of two bodies.

According to the invention, in a combination of two bodies, of which one performs a reciprocating movement relatively to the other and the surface parts of these bodies facing one another are spaced apart by an intermediate space of small cross section which contains lubricant, whilst a definite surface part of a reciprocating body is required to be kept free from excess lubricant, one body is provided with at least one slot which opens at the surface of this body and extends transversely to the direction of the reciprocating movement of the said body, the projections of the main directions of the side walls of the slot, viewed in the direction of the bottom of the slot, onto the direction of the reciprocating movement of the moving body being directed towards that surface part which is required to be kept free from excess lubricant, whilst the latter part of the surface is at a greater distance from the surface of the other body than that part of the surface of the moving body which is provided with lubricant.

The expression "free from excess lubricant" is to be understood to mean that the surface part free from excess lubricant is provided with a smaller quantity of lubricant than the other part of this surface. Sometimes, the surface parts required to be kept free from excess lubricant have substantially no lubricant at all, whereas other surface parts thus indicated have a small quantity thereof.

It is obvious that the reciprocating movement may be performed either by one of or by both of the bodies. In order to retain the lubricant to a sufficient degree, it is advisable that the slot should extend throughout the width of the surfaces facing each other. However, the direction of length of this slot need not be at right angles to the direction of movement of the moving body. Thus, for example, in the case of a round, cylindrical body, a helical or elliptical slot may be provided. The edges of the slot may be slightly rounded off or chamfered, and the side walls may exhibit unevenesses.

If the lubricant distribution over the surface of the one body, in this case a stationary body, is not uniform, the bottom of one or more of the slots may form a capillary slit to ensure a uniform distribution of the lubricant in the direction of length of the slot.

It may happen that, one body moving relatively to the other is not guided sufficiently or liable to wear. Thus, the surface part of the moving body, which is free from excess lubricant, may more closely approach the surface of the other body. Furthermore, the lubricant supply may be subject to variations. Thus, the lubricant transport may exceed the quantity initially determined. In order to obviate this disadvantage, the moving body may be provided with at least two directly succeeding, parallel grooves such that, viewed in the direction of the surface of the moving body, which is free from excess lubricant, the succeeding surface parts of this body which surface parts are separated from one another by slots, are spaced from the surface of the other body by an increasingly greater distance.

The combination according to the invention may be used with success, if the adjacent surfaces of the two bodies are at least substantially cylindrical or prismatic in shape, for example if the bodies consist of a piston and a sleeve-shaped body (for example a cylinder lining) in which this piston is adapted to move, or of a piston rod or valve rod with an associated bushing-shaped body.

The present invention may also be used with bodies having transverse profiles of very different shapes, for example, the cotterpin of a crosshead with its associated guide path, the transverse profile of the adjacent surfaces of cotter and guide path for example, being flat or slightly curved.

In a suitable embodiment of the invention, the slot is arranged before the rings of a piston provided with piston rings, viewed from that surface part of the moving body which is required to be kept free from excess lubricant.

In double-acting pistons it may be of importance to prevent the lubricant from penetrating into any of the working spaces at both sides of a piston. For this purpose, the moving body may be provided with at least two slots which are spaced apart by a certain distance and which extend in opposite directions, the lubricant being introduced into the lubricant-filled space between these slots. Similarly, if a rod, for example a valve spindle, is guided in a bushing, the lubricant may be, for example, supplied to the surface of the rod through a suitable aperture in the surface of the bushing.

In a further preferred embodiment of the invention, a moving body, viewed from the slot behind the part more remote from the surface of the other body, carries another part which is closer to the wall of the other body.

In certain cases, particularly when the lubricant supply to definite parts of an apparatus is required to be reduced, the slot may be provided in a separate ring, for example a piston ring.

Figure 3:
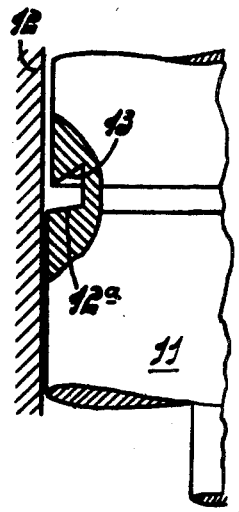
Figure 3A:
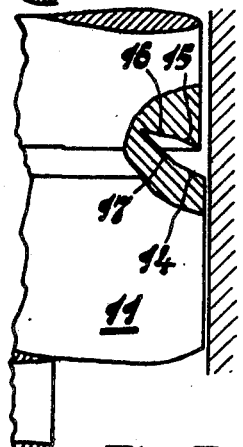
Figure 2:
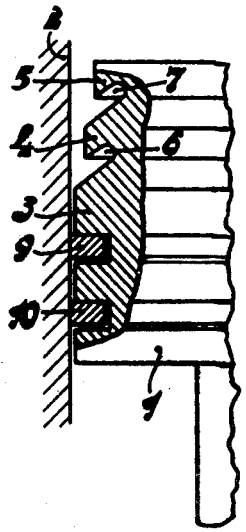
Figure 2A:
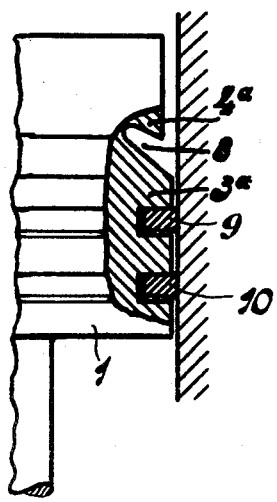

In order that the invention may be made clearly understood and readily carried into effect, it will now be described more fully with reference to the accompanying diagrammatic drawings, given by way of example, in which:

Fig. 1 shows the position of a slot relative to two bodies reciprocating with respect to one another in one embodiment of the invention;

Fig. 2 shows an embodiment of my invention as applied to a reciprocating piston, Fig. 2a shows another embodiment of my invention, Fig. 3 shows another embodiment of my invention, Fig. 3a shows still another alternate embodiment of my invention, Fig. 4 shows an embodiment in which a slot is provided for controlling lubricant supply to rings and another slot for reducing the lubricant supply to a working space, and Fig. 5 shows a reciprocating piston in use in a double-acting engine.

Referring now to Fig. 1 the position of a slot is shown with reference to the other parts of a body J reciprocating relatively to a body K as indicated by the arrows P. In the cross sectional view shown, the slot opens out at points D and F at the surface of the body J. The surface of the body J is divided by the groove into two surface parts, i. e. the part HF and the part DE, the part HF being more remote than part DE from the surface of the body K.

The part HF is required to be kept free from excess lubricant, whereas part DE may be provided with excess lubricant. The main directions of the side walls of the slot are indicated by the vectors AB and DL which are directed towards the bottom of the slot.

The projection AC of vector AB and the projections DN of the vector DL onto the direction of the reciprocating movement of the body J are now directed to the part HF which is required to be kept free from excess lubricant.

Referring to Fig. 2, a piston 1 is adapted to reciprocate in a cylinder 2. In Fig. 2, the piston 1 is provided with three cylindrical parts 3, 4 and 5 of different diameters. These cylindrical parts are separated by slots 6 and 7. In the construction shown in Fig. 2a, the piston is provided with only one slot 8, which separates cylindrical parts 3a and 4a. For a satisfactory operation the diameter of part 3 should exceed that of part 4, and the latter should in its turn exceed that of part 5. Similarly the diameter of part 3a is required to exceed that of part 4a. The piston 1 is provided with piston rings 9 and 10.

This lubricant stop operates as follows. During the reciprocating stroke of the piston 1 the lubricant is moved upwards along the wall of the piston. This effect is materially increased by the pumping effect of rings 9 and 10, since these rings fit, with a certain amount of play in the piston slots and this play implies that the ring is allowed to move slightly in this slot when the piston performs its reciprocating movement. Thus the lubricant is forced upwards behind the ring. At the upper part of the stroke the slots take up the lubricant from the wall of the body 2 and give it off at the lower part of the stroke. It is thus ensured that the transport of lubricant along the wall part 4 is reduced.

The embodiment shown in Fig. 2 has particular advantages, if the wall part 4 of the piston approaches the cylinder wall 2 too closely owing to insufficient linear guidance or for other reasons, or if the lubricant supply is subject to variations. In this event, the provision of the slot 7, which performs the same function as slot 6, ensures the desired reduction of the lubricant supply. It will be obvious that instead of two, three or more slots may be provided one after another.

Referring now to Fig. 3, a rod 11 is adapted to reciprocate in a guide 12. The effect of the slot is similar to that of the slots shown in Figs. 1 and 2. The slot shown in Figure 3 is provided at the bottom side with a side wall 12a extending substantially at right angles to the direction of movement of the body and at the top with a slanting sidewall 13. For a satisfactory operation of these slots it is required that at least one projection, preferably however the two projections of the main directions of the side walls of the slot, viewed in the direction of the bottom of the slot, onto the direction of the reciprocating movement of the moving body, are directed towards that surface part of the body which is required to be kept free from excess lubricant. Of this rod the cylindrical part above the slot again has a smaller diameter than the cylindrical part below the slot. The slot in Figure 3a is provided with two slanting sidewalls 14 and 15. The bottom of the slot is shaped as a capillary slit formed by the side walls 16 and 17. It is thus ensured that, if the lubricant supply is not uniform, the distribution of the lubricant in the direction of length of the slot becomes as uniform as possible.

In Fig. 4 a piston is shown adapted to move along a cylinder wall 21. This piston is provided with two slots 22 and 23. The lubricant which is conveyed upwards when the piston reciprocates, enters the slot 22, from which it is again supplied to the wall of the cylinder. The cylindrical part of the piston above this slot has a smaller diameter than the cylindrical part of the piston below this slot. The supply of lubricant fed to the rings 24 and 25 may now be controlled by the choice of the distance A between the ring 24 and the slot 22. If this distance exceeds the stroke of the piston, it is possible that substantially no lubricant is supplied to this ring, since it invariably moves along a substantially dry cylinder wall. If this distance is smaller than the stroke, the ring contacts to a greater or smaller extent with the lubricant film on the cylinder wall 21 with the result that a greater or smaller supply of lubricant is carried along with the piston.

The wall of the piston, the part of which near the piston rings 24 and 25 has a diameter equal to the diameter of the piston below the slot to ensure a better linear guidance, and the rings 24 and 25 again carry forward this controlled supply of lubricant. Although this supply may be materially smaller than the lubricant supplied to slot 22, it may be disadvantageous that this supply finds its way to the working space of the apparatus. This may be prevented by providing the slot 23 according to any of the forms shown in the figures. The cylindrical part of the piston above the slot 23 has a smaller diameter than the cylindrical part of the piston below this slot. In this figure, the slot 22 is slightly rounded off or bevelled at the ends of its sidewalls (at 26 and 27 respectively). In certain cases, for example in internal combustion engines, the piston may solely be provided with a regulating slot 22.

A piston 30 shown in Fig. 5 is adapted to move along the cylinder wall 31 of a double-acting engine. Since in a double-acting engine both the working spaces above and below the piston are employed, it is of importance that both working spaces should remain free of excess lubricant. In this event, the piston has two parts, one of which provides that one space is kept as free as possible from excess lubricant, and the other part keeps the other space as free as possible from excess lubricant. With this piston the lubricant is supplied through a channel system 32, 33 the lubricant entering a slit-shaped space between slots 34 and 35. With continuous lubrication, the excess lubricant is carried off through a channel system 36, 37, thus obtaining at the same time a satisfactory cooling of piston and rod. Also in this case, the piston forces the lubricant in the direction of the slots. The lubricant stops constituted by the slots 34 and 35 with the associated wall parts provide that the lubricant is not conveyed further or only partly conveyed further. It will be obvious that the slots 34 and 35 may be provided in many different forms as shown in the other figures. Also in this case, that part of the piston which is more remote from the lubricant supply than the part of the piston between the slot and the point of lubricant supply, has a smaller diameter than the other part of the piston. The lubricant supply may, as an alternative, take place through the wall of the cylinder. This requires, however, that the supply should take place opposite that part of the piston which is located between the slots. In this embodiment the lubricant supply may advantageously take place discontinuously and then the length of the piston stroke relatively to the distance between the slots of the piston may be chosen at will. It necessitates however, that the dosage of the lubricant is effected in the correct piston position.

In the drawing, all the pistons and connecting rods are vertical. According to the invention however, a satisfactory lubricant stop is also ensured if the pistons are inclined or given a horizontal position.

In the foregoing, an exactly rectilinear, reciprocating movement of the body is invariably concerned. It will, however, be obvious that the movement of the moving body need not be exactly rectilinear, but that the rectilinear movement may have superposed on, purposely or accidentally, a different movement, for example a rotary or a zigzag movement. This is, for example, the case with pistons reciprocated with the use of a swash plate mechanism.

The reciprocating movement may furthermore occur, not along a straight but along a curved line, for example with oscillatory movements.

What I claim is:

1. A device for reducing excess lubricant from relatively reciprocating lubricated bodies comprising a reciprocating body adapted to reciprocate relative to said other body, said reciprocating body having at least one slot therein extending angularly to the direction of movement of said reciprocating body, said slot defining two portions of said reciprocating body, one of said portions which is required to be kept substantially free from lubricant being spaced a greater distance from said other body than the other of said portions which contains lubricant, and opposite walls of said slot as viewed from the opening of said slot extending in the direction of said one portion.

2. A device as set forth in claim 1 wherein said reciprocating body is provided with at least two slots spaced apart and extending in opposite directions to one another, the lubricant being supplied in the space between said slots.

3. A device as set forth in claim 1 wherein the bottom of said slot forms a capillary slit.

4. A device as set forth in claim 1 wherein said reciprocating body is provided with at least two adjacent parallel slots, the adjacent portions of said reciprocating body defined by said slots being spaced from said other body by a progressively increasing distance as viewed in the direction of the one of said portions.

5. A device for reducing excess lubricant from relatively reciprocating lubricated bodies comprising a cylinder-like body and a piston-like body adapted to reciprocate relative to and in said cylinder-like body, said piston-like body having at least one slot therein extending angularly to the direction of movement of said piston-like body, said slot defining two portions of said piston-like body, one of said portions which is required to be kept substantially free from lubricant being spaced a greater distance from said cylinder-like body than the other of said portions which contains lubricant, and opposite walls of said slot as viewed from the opening of said slot extending in the direction of said one portion.

6. A device as set forth in claim 5 wherein said piston-like body is provided with a plurality of piston rings and said slot is located before said piston rings as viewed from the one of said portions.

7. A device as set forth in claim 5 wherein said piston-like body is provided with a plurality of piston rings and at least one slot positioned between two of said piston rings.

References Cited in the file of this patent

UNITED STATES PATENTS

| Number | Name | Date |
|---|---|---|
| 1,754,625 | Henning et al. | Apr. 15, 1930 |

FOREIGN PATENTS

| Number | Country | Date |
|---|---|---|
| 16,116 | Great Britain | Apr. 6, 1916 |